April 7, 1959     A. S. CHARLAT     2,880,632
POSITIONING TABLE

Filed Sept. 27, 1956     3 Sheets-Sheet 1

INVENTOR
Arnold S. Charlat
BY
Pennie Edmonds Morton Barrows Taylor
ATTORNEYS

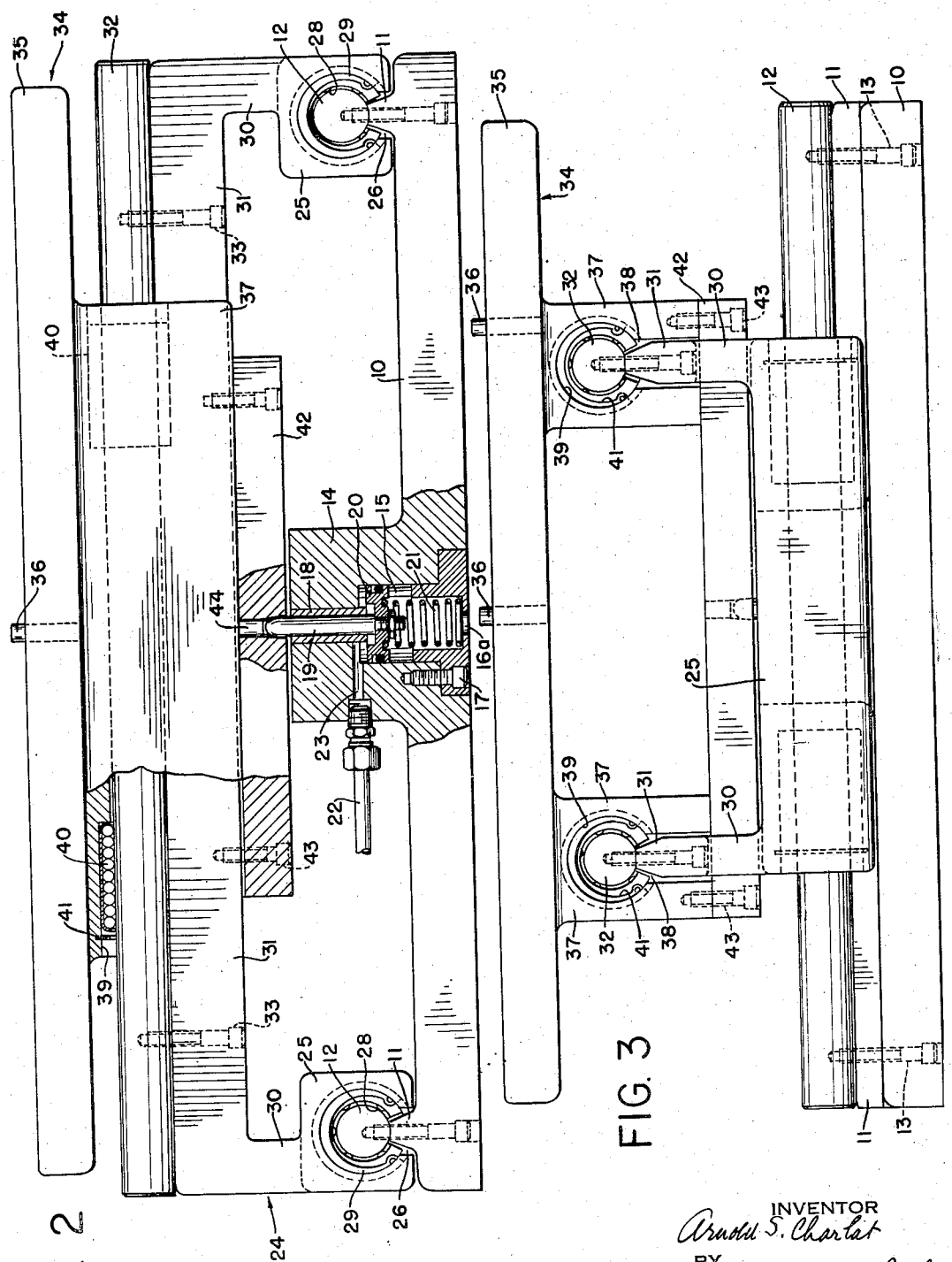

April 7, 1959  A. S. CHARLAT  2,880,632
POSITIONING TABLE
Filed Sept. 27, 1956  3 Sheets-Sheet 3

INVENTOR
Arnold S. Charlat
BY
Pennie Edmonds Morton Barrows Taylor
ATTORNEYS

United States Patent Office
2,880,632
Patented Apr. 7, 1959

2,880,632
POSITIONING TABLE

Arnold S. Charlat, Norwalk, Conn., assignor to Howe & Fant, Inc., East Norwalk, Conn., a corporation of Delaware Application September 27, 1956, Serial No. 612,545

2 Claims. (Cl. 77—64)

This invention relates to means for positioning a workpiece beneath and in proper relation to the tool of a machine, such as the drill of a drilling machine or the cutter of a milling machine, so that operations can be performed on the workpiece at desired locations. More particularly, the invention is concerned with a novel positioning table for supporting a workpiece during the performance of operations thereon, which includes a workpiece support freely movable translationally within limits in all directions in a plane, so that all points on the workpiece can be presented to the tool. In a form of the new tool suitable for use with a drilling machine, means are provided for locking the table in each of the positions necessary to bring beneath the tool the locations on the workpiece, where holes are to be drilled, and the locking means exactly centers the workpiece and can be quickly released. In a form of the table to be used with a milling machine, by which a cut, such as a channel of irregular form, is to be made in the workpiece, the table is provided with means, which act as an accurate guide for the support as the machine operator moves it relatively to the cutter to produce the desired cut.

The table of the invention offers especial advantages when employed with a drilling machine of the turret type, such as that disclosed in Grimes Patent 2,364,631, issued December 12, 1944, since the workpiece support of the table can be quickly moved to and locked in the desired positions, where operations can be performed on the workpiece on the support by the several drills mounted in the turret of the machine. The functions performed by the table are similar to those performed by the table of my co-pending application Ser. No. 573,053, filed March 21, 1956, but the present table is somewhat simpler in construction than the prior table.

For a better understanding of the invention, reference may be made to the accompanying drawings, in which Fig. 1 is a plan view with parts broken away of one form of the new table;

Fig. 2 is a view in side elevation with parts broken away of the table;

Fig. 3 is a view in front elevation of the table;

Figure 1:
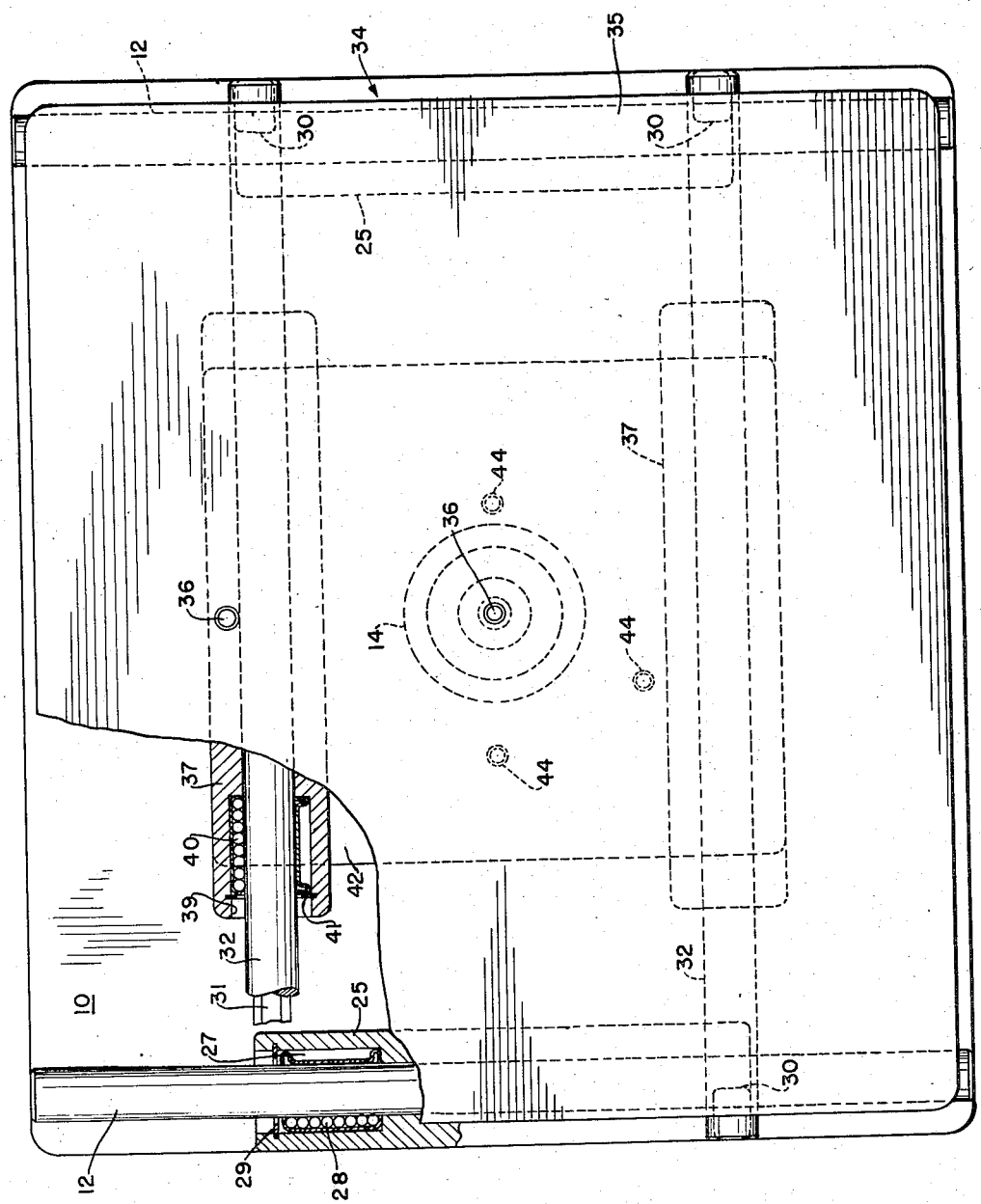
Figure 5:
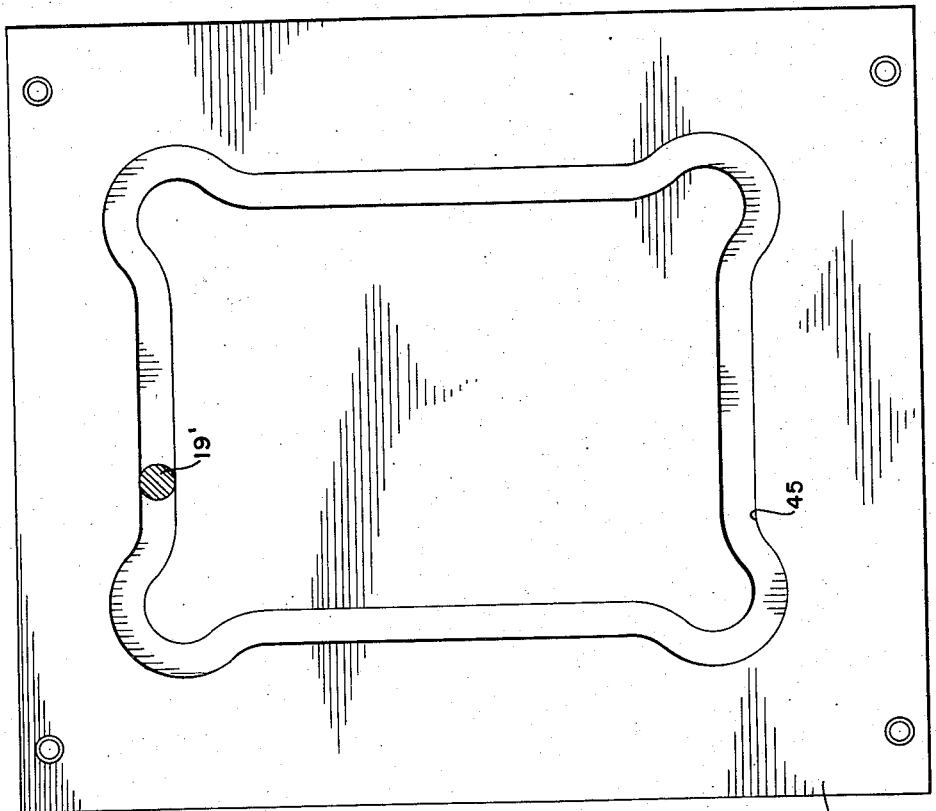
Fig. 5 is a bottom plan view on the line 5—5 of Fig. 4 of the location plate of the table.
Figure 4:
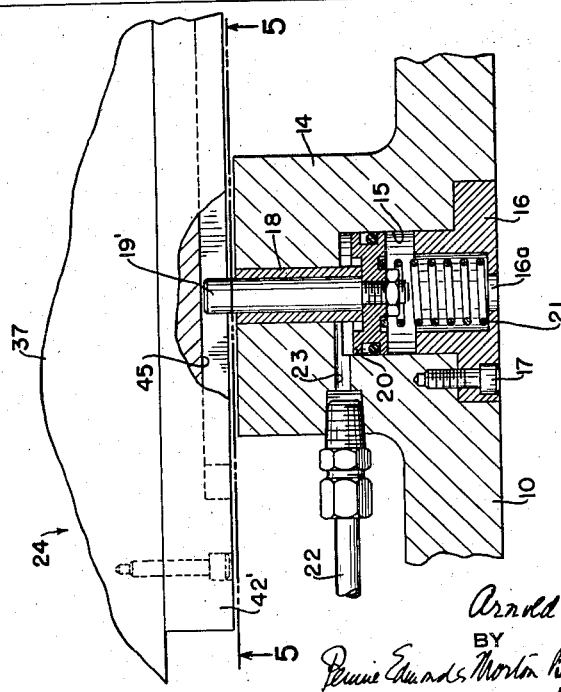
Fig. 4 is a fragmentary vertical sectional view with parts shown in elevation of a form of the table suitable for use with a milling machine.

The new table in the form illustrated in the drawings includes a base 10, which is a heavy metal plate provided with a pair of spaced integral parallel ribs 11 rising from its upper surface along its side edges and tapering in width upwardly. A bar 12 of circular cross-section is mounted on top of each rib to serve as a guide and the top of the rib is made concave to form a seat for the bar. The bar is held in place on its seat by screws 13 passed through openings in the base and rib and threaded into the bar. The bar is thus rigidly supported on the base throughout the length of the bar and it is of greater diameter than the width of the top of the rib, so that it projects on both sides of the rib.

At its center, the base is provided with an upstanding boss 14, which may be integral with the base and is formed with a chamber 15 opening through the bottom of the base and closed by a plug 16 having an opening 16a and held in place by screws 17 passed through openings in the plug and threaded into the base. As illustrated, the boss has a flat top of substantial area and a passage lined with a bushing 18 extends from the top of the chamber to open through the central part of the top of the boss and a pin 19 having a conical end is movable in the bushing and is attached at its lower end to a piston 20 within the chamber. A spring 21 seated at its lower end on the plug 16 within the chamber acts on the piston from beneath to move it toward the top of the chamber, so that pin 19 will project beyond the top of the boss, and the piston can be moved down against the resistance of the spring to retract the pin by fluid under pressure supplied from a source through a tube 22 connected to a passage 23 in the boss leading to the upper end of chamber 15.

A carriage indicated generally at 24 is mounted for movement along the guides 12 and the carriage includes a pair of frame members 25 extending parallel to the guides and having lengthwise passages 26 for receiving the guides. The passages are open at the bottom to receive the ribs 11 and each passage is enlarged at each end to provide a chamber 27, in which is mounted a split ball bearing 28 encircling a guide and held in place by a snap ring 29. Each frame member has an upward projection 30 at each end and the upper ends of the projections at corresponding ends of the frame members are connected by cross frame members 31, which taper in width upwardly and have concave seats at their tops. A guide 32 in the form of a bar of circular section rests on the seat on each member 31 and is held in place by screws 33 passed through openings in the member 31 and threaded into the bar. The frame members 25 of the carriage are substantially shorter than the guides 12 on the base, so that the carriage can be moved a considerable distance relative to the base on the guides.

A workpiece support 34 is mounted on the guides 32 on the carriage for movement lengthwise thereof and the support includes a flat table section 35, on which a workpiece is held by any of the usual workpiece holders. Such a holder may be secured to the table section by being bolted to the table section or to a wear plate secured to the table section and the holder and workpiece are properly positioned relative to the table section of the support by spaced pins 36, which enter openings in the holder or wear plate. The table section is provided with a pair of spaced projections 37 depending from its under side and formed with lengthwise passages 38 for receiving the guides 32 on the carriage. Each passage 38 is open at the bottom to receive a frame member 31 and it is enlarged at their ends to provide chambers 39. A split ball bearing 40 in each chamber encircles guide 32 and is held in place by a snap ring 41. The table section 35 of the workpiece support may have an area as large as the base or larger, but the projections 37 are shorter than the guides 32, so that the support can be moved on the guides a considerable distance relative to the carriage.

A location plate 42 is secured to the lower ends of the projections 37 by screws 43 and the plate is provided on its lower surface with a plurality of tapered openings 44, which may be entered by the pin 19. The plate is prepared for use in performing a number of operations at different locations on a series of like workpieces and the openings 44 are so disposed that, when the pin 19 enters an opening, one of the places, where an operation is to be performed on a workpiece held fast relative to the support by pins 36, is centered beneath the tool of the machine. The lower face of the location plate lies parallel to and is spaced a short distance from the top of the boss 14.

In the use of the positioning table, a location plate is first prepared by forming openings corresponding in number and relative position to the locations, where operations are to be performed on a workpiece in a holder resting on the table section 35 of the support and held against movement relative thereto by pins 36. The plate is then mounted on the lower ends of projections 37 on the support and, when a workpiece holder is placed on the table section and oriented by pins 36, the table section is moved, until the pin 19 enters one of the openings in the plate. Such movement may require that the carriage be moved along the guides on the base and that the support be moved along the guides on the carriage, but the operation of placing the plate with an opening in position to receive pin 19 is simple and quickly carried out. Since the pin has a tapered fit in the opening, the entry of the pin into the opening holds the support and the carriage against movement with the workpiece exactly centered in relation to the tool and the table is now ready for the first operation on the workpiece. When the operation has been completed, the pin is retracted by fluid admitted to the cylinder 15 and the support is moved to bring another opening in the plate into alignment with the pin. Such movement of the support causes another location on the workpiece, where an operation is to be performed, to be presented to the tool. The operations described are then repeated until the workpiece is finished.

When the table is to be used with a milling machine to produce a cut, such as a channel of irregular form, in the workpiece, a location plate 42' having a channel 45 of the shape of the desired cut formed in its lower face is prepared and the plate is mounted on the lower ends of projections 37 in the same manner as plate 42. The channel is of uniform width from top to bottom and its width is substantially the same as the diameter of the milling cutter to be used. The tapered pin 19 is replaced by a pin 19', which is cylindrical and of the same diameter as the cutter.

In the use of the table with a milling machine, the workpiece support is moved relatively to the base until the channel 45 lies above the pin 19' and the pin enters the channel. The machine is then started and, as the cutting operation is carried on, the machine operator moves the support relatively to the cutter. The engagement of the pin with the walls of the channel insures that the support will move along a path, such that the cutter will cut a channel in the workpiece the same as that on the location plate. The cutter may thus be considered to cut an infinite number of holes connected to form the channel.

The new table is simple in construction and affords great accuracy in the positioning of a workpiece relative to the tool of the machine, since the horizontal translational movements of the carriage and support are along guides, which are so supported, that the likelihood of inaccurate positioning of the workpiece relative to the tool as a result of downward distortion of the guides caused by the pressure of the tool on the workpiece or the weight of the workpiece is greatly reduced. Also, the table is so constructed that it is easy to keep it free of chips, which are produced in operations on workpieces and, if not removed, might cause inaccuracies in positioning as well as wear.

I claim:

1. A table for positioning a workpiece beneath the tool of a machine, which comprises a base, a pair of spaced parallel ribs on the top of the base extending upward therefrom, a pair of guides mounted on top of respective ribs to extend lengthwise thereof in parallel relation, the guides projecting beyond the sides of the tops of the ribs, a carriage mounted for movement on and along the guides, the carriage including a pair of spaced parallel frame members lying at right angles to the guides on the base, pairs of split ball bearings, one pair for each guide, mounted on the carriage with the bearings of the pairs partially encircling respective guides, a pair of guides mounted on top of respective frame members to extend lengthwise thereof in parallel relation, a workpiece support mounted for movement on and along the guides on the carriage, pairs of split ball bearings, one pair for each guide on the carriage, mounted on the workpiece support with the bearings of the pairs partially encircling respective guides on the carriage, means on the support for holding a workpiece fixed on the support in position to be acted on by the tool, a location plate attached to the under side of the workpiece support in fixed relation to the holding means and having at least one hole in a position corresponding to a location on a workpiece held by the holding means, and means, including a pin engageable in the hole in the plate, for holding the support with the workpiece thereon in a desired position relative to the tool.

2. The table of claim 1, in which the carriage is an open center frame, the location plate is accessible from beneath through the carriage, the means for holding the support against movement is mounted on the base, the pin is vertically movable, and the pin and the hole in the location plate have mating tapers.

References Cited in the file of this patent

UNITED STATES PATENTS

| | | |
|---|---|---|
| 2,633,777 | Hoern | Apr. 7, 1953 |
| 2,640,376 | Johnson | June 2, 1953 |
| 2,645,161 | Stuart et al. | July 14, 1953 |
| 2,674,139 | Stern | Apr. 6, 1954 |
| 2,742,801 | Opocensky et al. | Apr. 24, 1956 |

FOREIGN PATENTS

| | | |
|---|---|---|
| 281,777 | Great Britain | Dec. 12, 1927 |
| 253,762 | Switzerland | Nov. 16, 1948 |